United States Patent
Crozat

(10) Patent No.: US 6,178,336 B1
(45) Date of Patent: Jan. 23, 2001

(54) SUBSCRIBER IDENTITY MODULE FOR A MOBILE TELECOMMUNICATIONS TERMINAL, AND A MOBILE TELECOMMUNICATIONS TERMINAL

(75) Inventor: Marielle Crozat, Le Chesnay (FR)

(73) Assignee: Alcatel, Paris (FR)

( * ) Notice: Under 35 U.S.C. 154(b), the term of this patent shall be extended for 0 days.

(21) Appl. No.: 08/972,890

(22) Filed: Nov. 18, 1997

(30) Foreign Application Priority Data

Nov. 19, 1996 (FR) .................................................. 96 14061

(51) Int. Cl.⁷ .............................. H04B 1/38; H04M 1/00
(52) U.S. Cl. .......................... 455/558; 455/90; 455/575; 455/466; 455/414; 379/357
(58) Field of Search ..................... 455/414, 557, 455/558, 90, 550, 575, 418, 425, 559, 556, 552, 551, 420, 405–408; 379/111, 114, 120, 357, 420; 365/50–52

(56) References Cited

U.S. PATENT DOCUMENTS

| | | | |
|---|---|---|---|
| 5,103,079 | * 4/1992 | Barakai et al. | 235/380 |
| 5,148,474 | * 9/1992 | Haralambopoulos et al. | 379/111 |
| 5,353,328 | * 10/1994 | Jokimies | 455/558 |
| 5,404,580 | * 4/1995 | Simpson et al. | 455/558 |
| 5,444,764 | * 8/1995 | Galecki | 455/411 |
| 5,448,765 | * 9/1995 | Kovanen et al. | 455/90 |
| 5,465,401 | * 11/1995 | Thompson | 455/558 |
| 5,687,216 | * 11/1997 | Svensson | 455/412 |
| 5,761,624 | * 6/1998 | Mooney et al. | 455/558 |
| 5,875,404 | * 2/1999 | Messiet | 455/558 |
| 5,877,975 | * 3/1999 | Jigour et al. | 365/52 |
| 5,884,168 | * 3/1999 | Kolev et al. | 455/432 |
| 5,915,226 | * 6/1999 | Martineau | 455/558 |

FOREIGN PATENT DOCUMENTS

| | | |
|---|---|---|
| 0555992A1 | 8/1993 | (EP) . |
| 0644513A2 | 3/1995 | (EP) . |
| WO94/30023 | 12/1994 | (WO) . |
| WO95/12293 | 5/1995 | (WO) . |
| WO95/28062 | 10/1995 | (WO) . |

* cited by examiner

Primary Examiner—Dwayne D. Bost
Assistant Examiner—Charles Craver
(74) Attorney, Agent, or Firm—Sughrue, Mion, Zinn, Macpeak & Seas, PLLC

(57) ABSTRACT

A subscriber identity module for a mobile telecommunications terminal, said module including means for storing "basic" data relating to facilities offered to the user for accessing telecommunications services, said data being stored in a predefined memory zone in order to ensure compatibility between the module and the various types of mobile terminal that are suitable for receiving such a module, and said module essentially further including means for storing associated complementary data, relating to complementary facilities, and for storing said data in another predefined memory zone so as to provide compatibility between the module and certain terminals only.

16 Claims, 2 Drawing Sheets

SUBSCRIBER IDENTITY MODULE FOR A MOBILE TELECOMMUNICATIONS TERMINAL, AND A MOBILE TELECOMMUNICATIONS TERMINAL

The present invention relates in general to mobile telecommunications terminals, and more particularly to the facilities offered by such terminals for accessing telecommunications services.

BACKGROUND OF THE INVENTION

As an example of such facilities, mention can be made of: the option of storing phone book type data, facilitating access both to "basic" services and to "value-added" operator services (such as interactive services, in particular), or indeed to perform operations on "supplementary" services (for example call forwarding, barring outgoing calls, etc. . . . ), or indeed, for mobile telecommunications networks that provide not only a telephony service but also a service for transmitting short alphanumeric messages, the option of storing short alphanumeric messages to be transmitted, or as received, by said terminals.

It is known to store data related in this way to such facilities in the terminal itself, or for greater flexibility, in an element referred to as a "subscriber identity module" which, in practice, is in the form of a smart card designed to be inserted in the terminal to enable it to be used, said card also being referred to as an "SIM" card (for "subscriber identity module") in the mobile telecommunications system known under the name GSM (for "Global System for Mobile communications").

As laid down in GSM Recommendation 11.11, the data relating in this way to such facilities, together with the data relating to subscriber identity, is stored in predetermined memory zones of the card, in such a manner as to ensure that the card is compatible with the various types of GSM terminal that might receive it. It is thus possible to take advantage of said facilities from any terminal capable of receiving such a card.

OBJECTS AND SUMMARY OF THE INVENTION

A particular object of the present invention is to increase the quality of service related in this way to such facilities, but to allow such an improved quality of service to be obtained only from certain kinds of terminal, thus making them recognizable by the quality of service they provide.

The invention thus consists in a subscriber identity module for a mobile telecommunications terminal, said module including means for storing "basic" data relating to facilities offered to the user for accessing telecommunications services, said data being stored in a predefined memory zone in order to ensure compatibility between the module and the various types of mobile terminal that are suitable for receiving such a module, and said module essentially further including means for storing associated complementary data, relating to complementary facilities, and for storing said data in another predefined memory zone so as to provide compatibility between the module and certain terminals only.

The invention also provides a mobile telecommunications terminal designed to be fitted with such a module, the terminal including means for reading basic data stored in such a module, and means for making use of basic data read in this way, and said terminal essentially further including means that make it possible, when reading basic data, to control subsequent reading of associated complementary data, and to make use of the complementary data read in this way.

The invention also provides a mobile telecommunications terminal for co-operating with a subscriber identity module itself including means for storing "basic" data relating to facilities offered to the user for accessing telecommunications services, the terminal including means for reading such basic data stored in such a module, and for making use of the basic data read in this way, and said terminal essentially further including means for storing associated complementary data relating to complementary facilities, and means making it possible, in the event of reading basic data in said module, to control subsequent reading of associated complementary data in said terminal, and to make use of the complementary data read in this way.

BRIEF DESCRIPTION OF THE DRAWINGS

Other objects and characteristics of the present invention appear on reading the following description of an embodiment which corresponds by way of example to the case where said complementary data is stored in the subscriber identity module, the description being given with reference to the accompanying drawings, in which.

MORE DETAILED DESCRIPTION

Figure 1:
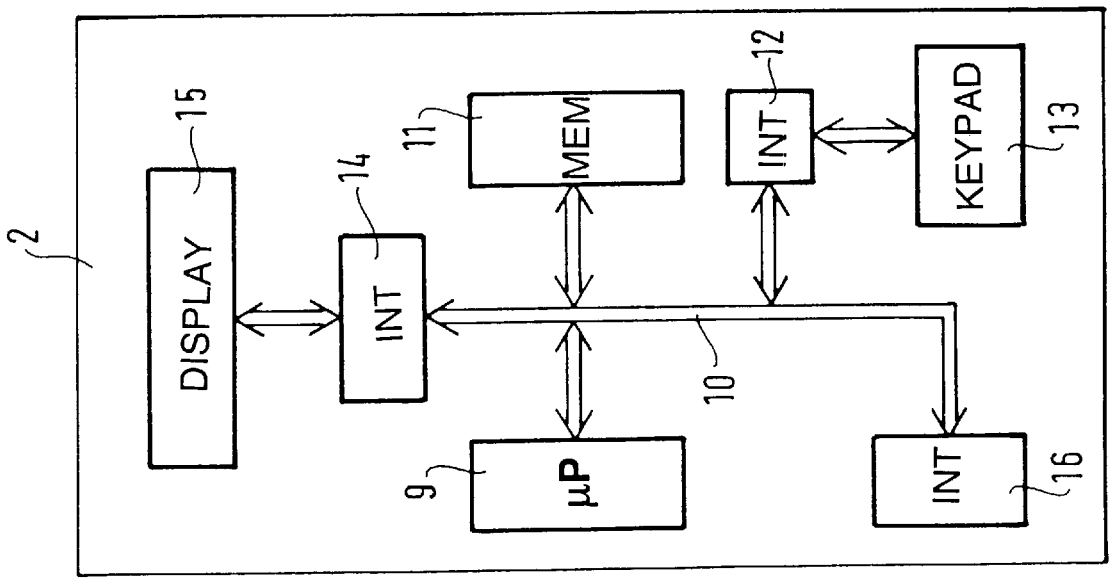
FIG. 1 is a block diagram outlining the structure of a mobile telecommunications terminal together with a subscriber identity module.
Figure 1:
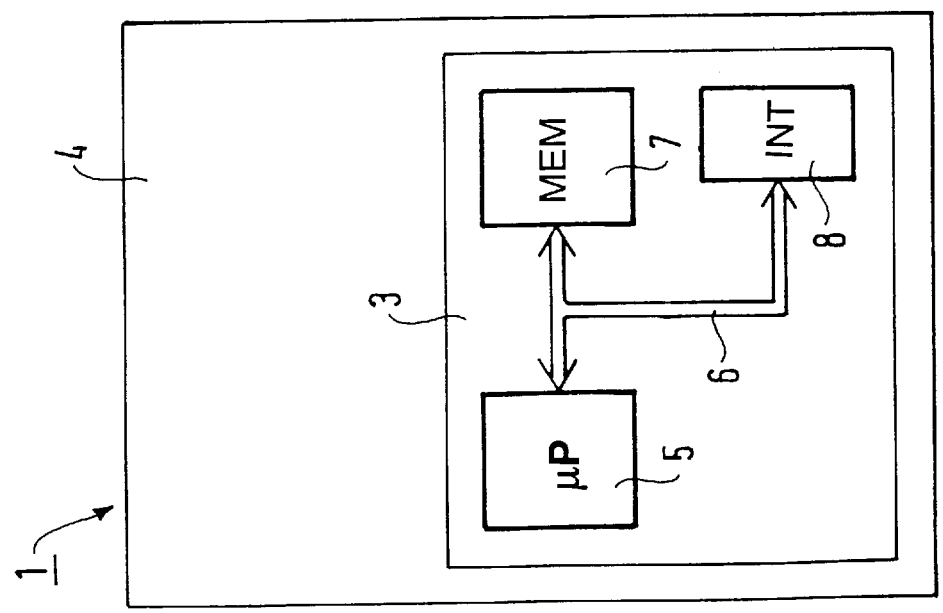

FIG. 1 shows a subscriber identity module 1 and a mobile telecommunications terminal 2.

The subscriber identity module 1 is constituted in particular by a semiconductor chip 3 carried by a support 4, e.g. a so-called "SIM" card, and essentially comprises data processing means 5 (in particular a microprocessor) connected via a bus 6 with data storage means 7 and with means 8 for constituting an interface with the terminal 2, the interface means 8 including, in particular, connection means constituted by a set of metal contact areas provided on said chip and designed to come into contact with a complementary connector fitted to a SIM card reader provided in the terminal 2.

The terminal 2 essentially comprises data processing means 9 (in particular a microprocessor), connected via a bus 10 with data storage means 11, together with means 12 providing an interface with a keypad 13, means 14 providing an interface with a display 15, and means 16 providing an interface with the subscriber identity module 2, the interface means 16 including, in particular, a SIM card reader.

Figure 2:
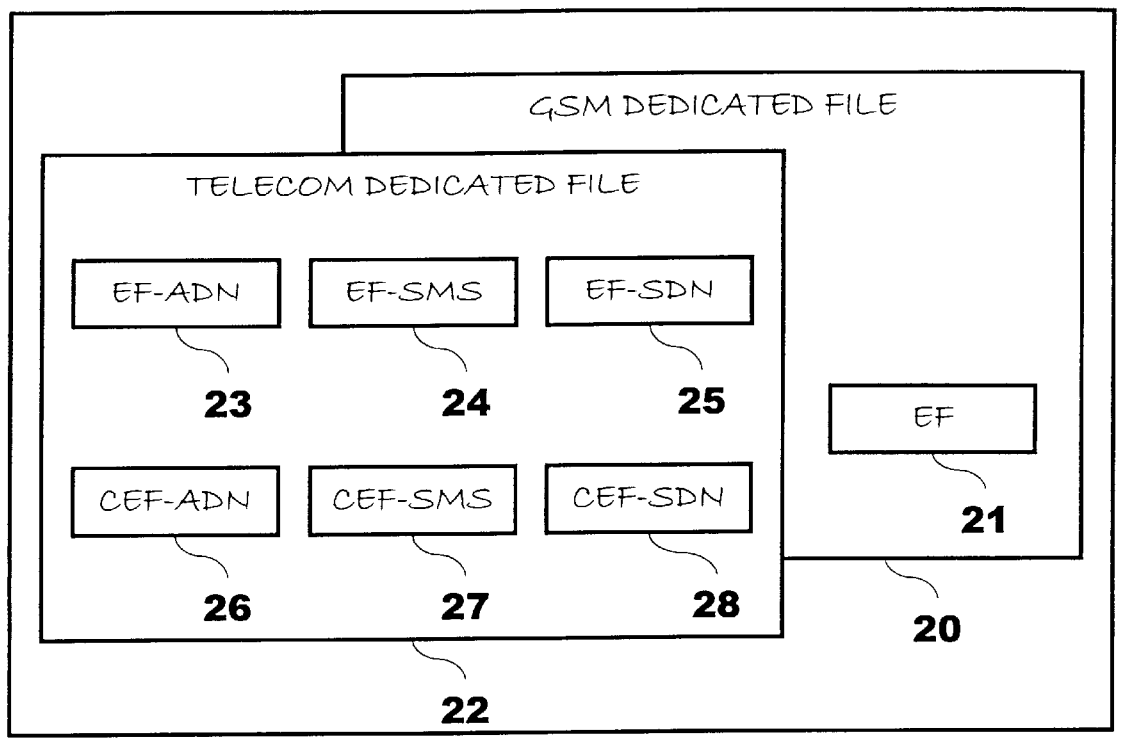
FIG. 2 is a diagram for illustrating how data is organized in the memory of a subscriber identity module of the invention.

FIG. 2 shows how data is organized in the data storage means 7 of the subscriber identity module.

As described in GSM Recommendation 11.11, the data stored in said storage means is organized in entities referred to as elementary data files.

The elementary data files are grouped together in entities called "dedicated" files; there thus exists a dedicated file referred to as the "GSM dedicated file", referenced 20 in FIG. 2, having elementary files such as 21 that contain data relating to subscriber identity, and a dedicated file referred to as the "Telecom dedicated file" referenced 22, having elementary files that contain data relating to said facilities offered to the user for accessing telecommunications services.

In the Telecom dedicated file, there thus exists, in particular:

an elementary file, referenced 23, for abbreviated dialing numbers (EF-ADN) that contains a phone book of data referred to herein as "basic" data, such as telephone numbers or control strings for supplementary services, and subscriber names or identifiers corresponding to said telephone numbers or said strings, in particular for the purpose of abbreviated dialing, or of operations on supplementary services;

an elementary file, referenced 24, for short message service (EF-SMS) intended for telecommunications services constituted by services for transmitting short alphanumeric messages, for containing data referred to herein as "basic" data corresponding to short messages received by the terminal or to be transmitted by the terminal; and an elementary file referenced 25 for service dialing numbers (EF-SDN) intended for telecommunications services constituted by "value-added" operator services, and for containing data referred to herein as "basic" data such as telephone numbers or control strings for supplementary services, together with the names of added-value operator services corresponding to said telephone numbers or said strings, in particular for abbreviated dialing, or for operations on the supplementary services.

Each of the above files is identified by the memory zone it occupies within said storage means, the memory zone being predefined so as to ensure compatibility between the card and various types of terminal that might receive it.

Each elementary data file is defined by its characteristics, and in particular conditions for accessing the elementary file, and by the data itself.

According to the invention, the data storage means are also used for storing complementary data associated with such basic data, the complementary data being relating to so-called "complementary" facilities, and being stored in another memory zone, that is predefined in such a manner as to enable the card to be compatible with certain types of terminal only, thus associating said types of terminal with a certain quality of service.

Complementary elementary files can thus be created for such complementary data. By way of example, the following may thus be created, e.g. in the Telecom dedicated file:

a complementary elementary file referenced 26 for abbreviated dialing numbers, referred to as CEF-ADN, that is to contain complementary data associated with basic data constituted in this case by phone book data stored in the elementary file EF-ADN, said complementary data making it possible to further facilitate access to basic services, or the operations performed on supplementary services, and including, for example, so-called "complementary" information such as, for example, addresses and/or comments associated with various telephone numbers or control strings for supplementary services in the phone book, to inform the user, in particular before selecting one of said numbers or one of said strings, and/or "identity" data making it easy to identify such a number or such a string, in particular by means of a graphics symbol associated with the number or with the string;

a complementary elementary file referenced 27 for short message service and also referred to as CEF-SMS intended to contain complementary data associated with basic data constituted in this case by short alphanumeric messages stored in the elementary file EF-SMS, said complementary data serving to further facilitate access to services for transmitting short alphanumeric messages, and including, for example, complementary short alphanumeric messages (for example such as various possible message endings, which may be associated with various message starts stored in the file EF-SMS, for example various places or times that may be possible for a rendezvous, in association with a start of message of the type "Rendezvous at . . . "), and/or "identity" data making it easy to identify such a message, in particular by means of a graphics symbol associated with the message; and a complementary elementary file referenced 28 for service dialing numbers, also referred to as CEF-SDN, intended to contain complementary data associated with basic data constituted in this case by phone book data stored in the elementary file EF-SDN, said complementary data making it possible to further facilitate access to "added-value" operator services, and comprising, for example, "complementary information" data about the services, to inform the user about the content of said services, in particular before selecting one of them, and/or "identity" data making such a service easy to identify, in particular by a graphics symbol associated with the service, and/or messages for guiding the user while using such a service, in particular when the service is interactive.

Figure 3:
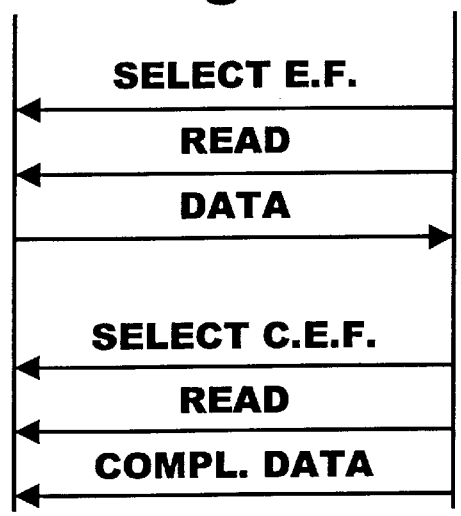
FIG. 3 is a diagram for illustrating how information is interchanged at the interface between a terminal of the invention and a subscriber identity module of the invention.

FIG. 3 shows the information interchanged via the interface between a terminal of the invention and a subscriber identity module of the invention.

In accordance with GSM Recommendation 11.11, data stored in a given record of a given elementary file of the subscriber identity module requires the terminal to send over the interface between the interface and the terminal an instruction for selecting the elementary file, written "SELECT E.F." (for "Select Elementary File"), and then an instruction for reading within the elementary file, referred to as "READ", with the module then sending data over the interface, referenced "DATA", and corresponding to the result of reading.

In accordance with the invention, once such data has been read in one of the elementary files, there follows, either automatically or at user request, reading of associated complementary data stored in the associated complementary file.

This reading of complementary data requires, in similar manner, the terminal to send an instruction over the interface between the module and the terminal to select the complementary elementary file, referenced herein in similar manner "SELECT C.E.F." (for "Select Complementary Elementary File"), followed by an instruction for reading from within the complementary elementary file which is again referenced in similar manner "READ", and then by the module sending complementary data over the interface, referenced "COMPL. DATA", corresponding to the result of the read operation.

As an example of reading and using such complementary data, mention is made of the following:

for complementary data stored in the Complementary Elementary File-Abbreviated Dialing Numbers (CEF-ADN), associated with basic data constituted by phone book data stored in the elementary file EF-ADN, and constituted, for example, by complementary information data (for example such as addresses and/or comments associated with the various phone numbers or control strings for supplementary services stored in the phone book), and/or by identity data making it easy to identify a phone number or a control string stored in the phone book (for example such as a graphics symbol associated with said number or said string), with the complementary data being displayed either automatically, or at user request, e.g. by pressing on a function key situated facing a corresponding help icon displayed when selecting a number or a string stored in the phone book;

for complementary data stored in the Complementary Elementary File-Short Message Service (CEF-SMS), associated with basic data constituted in this case by short alphanumeric messages stored in the elementary file EF-SMS, and constituted, for example, by complementary short alphanumeric messages (such as, for example, various possible message endings that may be associated with various message starts stored in the file EF-SMS, such as, for example, various times and places that are possible for a rendezvous, for associating with a message start of the type "Rendezvous at . . . "), and/or by data enabling the message to be identified easily, in particular by means of a graphics symbol associated with the message, said complementary data is displayed either automatically or at user request, e.g. by pressing on a function key situated facing a corresponding help icon displayed while selecting a message start stored in the elementary file, so as to enable the user to select one of the message endings and thereby obtain a complete message for transmission, thus also serving to limit the number of key strokes required for sending messages via the keypad of the terminal; and for complementary data stored in the Complementary Elementary file-Service Dialing Numbers (CEF-SDN) associated with basic data constituted in this case by phone book data stored in the elementary file EF-SDN, and constituted, for example, by complementary information data concerning the proposed added-value operator services, and/or by identity data, for example such as graphics symbols, enabling such a service to be identified easily, and/or by messages for providing guidance while using a service of the interactive type, with such complementary data being displayed either automatically, or at the request of the user, e.g. by pressing on a function key situated facing a corresponding help icon displayed while selecting a service name stored in the elementary file EF-SDN.

A terminal that is compatible with a subscriber identity module as described above then includes, in addition to means for controlling the reading of basic data and for making use of the basic data read in this way, means for controlling the reading of the associated complementary data and for making use of the complementary data, e.g. in the manner of the examples described above.

In practice, such means are constituted using conventional techniques that are therefore not described below, in appropriate sequences of instructions stored in the data processing means (in particular a microprocessor) of the terminal.

Said complementary data may be written using the principles that are already in use for the basic data.

It should merely be observed that for elementary files (such as the files EF-SDN and CEF-SDN) that contain data relating to added-value operator services, which data is not writable by users but only by the operator of the network under consideration, it may be advantageous to store said data in the subscriber identity module rather than in the terminal itself, so as to make it easier for the operator to update it.

It should also be observed that the various names of the elementary files, such as EF-ADN, EF-SFM, or EF-SDN, mentioned in the description above have been given purely by way of example and that the invention naturally extends to any "basic" data stored in predefined memory zones of the subscriber identity module so as to enable the module to be compatible with all of the terminals that might receive it, and regardless of whether the basic data is already the subject of standardization or is going to be standardized in the future.

It would also be observed that although the above description corresponds more particularly, by way of example, to the case where said complementary data is stored in the subscriber identity module, it would also be possible to store such data in the terminal itself. In which case, such a terminal would include not only means for reading basic data stored in the subscriber identity module, and for making use of the basic data read in this way, but also means for storing associated complementary data, relating to complementary facilities, and means making it possible when reading basic data from said module to control subsequent reading within the terminal of the associated complementary data, and to make use of the complementary data read in this way.

What is claimed is:

1. A mobile telecommunications terminal subscriber identity module, comprising:
   basic data relating to basic functionalities commonly provided by a plurality of different types of mobile telecommunications terminals for user implementation of common telecommunications services, said basic data being stored in a basic data predefined memory zone; and
   corresponding complementary data relating to a complementary facility for providing additional functionality or information associated with said basic functionalities and being provided by only a certain type of said different types of mobile terminals, said complementary data being stored in a predefined complementary data memory zone different from said basic data predefined memory zone.

2. A module according to claim 1, wherein said basic data is phone book data and includes telephone numbers relating to accessing basic services or to supplementary services, and wherein said complementary data comprises at least one of:
   information relating to ones of said telephone numbers; and
   control strings, for supplementary services, stored in the phone book data.

3. A module according to claim 1, wherein:
   said basic data is phone book data relating to accessing at least one of basic services and supplementary services,
   said complementary data is identity data for identifying stored information, said stored information including at least one of:
   telephone numbers stored in said phone book data, and
   control strings for supplementary services stored in said phone book data; and
   wherein said identity data comprises graphics symbols associated with said stored information.

4. A mobile telecommunications terminal subscriber identity module, comprising:
   basic data relating to a basic facility for user access of telecommunications services, said basic data being stored in a basic data predefined memory zone, and being compatible with all of a plurality of different types of mobile terminals; and corresponding complementary data relating to a complementary facility associated with said basic facility, said complementary data being stored in a predefined complementary data memory zone different from said basic data predefined memory zone, and being compatible with only a certain type of said plurality of different types of mobile terminals, wherein:

said basic data relates to accessing services for transmitting short alphanumeric messages, and said complementary data comprises complementary short alphanumeric messages including endings that can be associated with said basic data as short alphanumeric message starts.

5. A module according to claim 1, wherein:

said basic data relates to accessing services for transmitting short alphanumeric messages, and said complementary data comprises identity data for identifying ones of said messages by means of an associated graphics symbol.

6. A module according to claim 1, wherein:

said basic data relates to accessing added-value operator services, and said complementary data includes complementary information data concerning the added-value operator services.

7. A module according to claim 1, wherein:

said basic data relates to accessing added-value operator services, and said complementary data includes data for identifying said operator services using graphic symbols.

8. A module according to claim 1, wherein:

said basic data relates to accessing added-value operator services, and said complementary data comprises messages for guiding the user while using an interactive type of said operator services.

9. A mobile telecommunications terminal, comprising:

a subscriber identity module, comprising:

basic data relating to basic functionalities commonly provided by a plurality of different types of mobile telecommunications terminals for user implementation of common telecommunications services, said basic data being stored in a basic data predefined memory zone; and corresponding complementary data relating to a complementary facility for providing additional functionality or information associated with said basic functionalities and being provided by only a certain type of said different types of mobile terminals, said complementary data being stored in a predefined complementary data memory zone different from said basic data predefined memory zone; and a processor controlling said terminal to:

read said basic data stored in said subscriber identity module, make use of said basic data thus read in accordance with said basic functionalities, control, when reading said basic data, a subsequent reading of said corresponding complementary data, and make use of said corresponding complementary data, when said mobile telecommunications terminal is said certain type, in accordance with said complementary facility.

10. A mobile telecommunications terminal for co-operating with a subscriber identity module comprising a first data storage device for storing basic data relating to basic functionalities commonly provided by a plurality of different types of mobile telecommunications terminals for user implementation of common telecommunications services, the terminal comprising a processor for reading said basic data stored in said first data storage device of said module, and for making use of the basic data read in this way, and a second data storage device for storing corresponding complementary data relating to complementary facility for providing additional functionality or information associated with said basic functionalities and being provided by only a certain type of said different types of mobile terminals, wherein said processor, when reading said basic data in said module, controls a subsequent reading of said corresponding complementary data in said terminal, and makes use of said corresponding complementary data in accordance with said complementary facility.

11. A terminal according to claim 10, wherein said basic data is phone book data and includes telephone numbers relating to accessing basic services or to supplementary services, and wherein said complementary data comprises at least one of:

information relating to ones of said telephone numbers; and control strings, for supplementary services, stored in the phone book data.

12. A terminal according to claim 10, wherein:

said basic data is phone book data relating to accessing at least one of basic services and supplementary services, said complementary data is identity data for identifying stored information, said stored information including at least one of:

telephone numbers stored in said phone book data, and control strings for supplementary services stored in said phone book data; and wherein said identity data comprises graphics symbols associated with said stored information.

13. A mobile telecommunications terminal for co-operating with a subscriber identity module itself including means for storing basic data relating to facilities offered to the user for accessing telecommunications services, the terminal including a processor for reading said basic data stored in said module, and for making use of the basic data read in this way, and said terminal further including stored corresponding complementary data relating to complementary facilities, wherein said processor, when reading said basic data in said module, controls a subsequent reading of said corresponding complementary data in said terminal, and makes use of said corresponding complementary data in accordance with said complementary facilities, wherein:

said basic data relates to accessing services for transmitting short alphanumeric messages, and said complementary data comprises complementary short alphanumeric messages including endings that can be associated with said basic data as short alphanumeric message starts.

14. A terminal according to claim 10, wherein:

said basic data relates to accessing added-value operator services, and said complementary data includes complementary information data concerning the added-value operator services.

15. A terminal according to claim 10, wherein:

said basic data relates to accessing added-value operator services, and said complementary data includes data for identifying said operator services using graphic symbols.

16. A terminal according to claim 10, wherein:

said basic data relates to accessing added-value operator services, and
said complementary data comprises messages for guiding the user while using an interactive type of said operator services.

* * * * *